(12) United States Patent
Yokota (10) Patent No.: US 7,342,335 B2
(45) Date of Patent: Mar. 11, 2008

(54) MAGNETOELECTRIC GENERATOR AND METHOD FOR MANUFACTURE THEREOF

(75) Inventor: Hirohisa Yokota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/492,968

(22) Filed: Jul. 26, 2006

(65) Prior Publication Data

US 2007/0222322 A1 Sep. 27, 2007

(30) Foreign Application Priority Data

Mar. 23, 2006 (JP) .............................. 2006-081377

(51) Int. Cl.
*H02K 3/50* (2006.01)
(52) U.S. Cl. .................. 310/71; 310/214; 310/153; 310/67 R; 29/595
(58) Field of Classification Search ................ 310/12, 310/67 R, 198, 214, 254, 71, 153, 42, 43, 310/45, 47, 87, 260; 29/595
See application file for complete search history.

(56) References Cited

U.S. PATENT DOCUMENTS

| | | | | |
|---|---|---|---|---|
| 3,678,913 A | * | 7/1972 | Zimmermann et al. | 123/149 D |
| 4,177,397 A | * | 12/1979 | Lill | 310/71 |
| 5,532,533 A | * | 7/1996 | Mizutani | 310/68 B |
| 5,708,315 A | * | 1/1998 | Gould et al. | 310/180 |
| 6,137,198 A | * | 10/2000 | Kawamura | 310/71 |
| 6,389,679 B1 | * | 5/2002 | Kliman et al. | 29/596 |
| 6,509,665 B1 | * | 1/2003 | Nishiyama et al. | 310/215 |
| 6,710,475 B2 | * | 3/2004 | Nishida et al. | 310/254 |
| 6,844,650 B2 | * | 1/2005 | Hirano et al. | 310/198 |
| 2004/0245878 A1 | * | 12/2004 | Kim et al. | 310/114 |
| 2005/0057106 A1 | * | 3/2005 | Allen et al. | 310/54 |
| 2005/0067914 A1 | * | 3/2005 | Baba et al. | 310/216 |
| 2005/0073204 A1 | * | 4/2005 | Puterbaugh et al. | 310/89 |

FOREIGN PATENT DOCUMENTS

| | | | |
|---|---|---|---|
| JP | 60223447 A | * | 11/1985 |
| JP | 7-11881 U | | 2/1995 |
| JP | 09308166 A | * | 11/1997 |
| JP | 2003164096 A | * | 6/2003 |
| JP | 2005287221 A | * | 10/2005 |

* cited by examiner

*Primary Examiner*—Darren Schuberg
*Assistant Examiner*—Dustin Jacobs
(74) *Attorney, Agent, or Firm*—Sughrue Mion, PLLC

(57) ABSTRACT

A magnetoelectric generator includes: a generating coil that is constituted by: a generating coil main body in which a conducting wire is wound onto respective teeth of a stator core; and an output wire that is led axially outward from the generating coil main body; and a varnish that is applied to a surface of the generating coil and heat-hardened, and an insulating insert is inserted into a gap in the generating coil between adjacent teeth; and the output wire is fixed to the generating coil main body by the varnish and is also fixed by being held between the insulating insert and the generating coil main body.

7 Claims, 6 Drawing Sheets

MAGNETOELECTRIC GENERATOR AND METHOD FOR MANUFACTURE THEREOF

BACKGROUND OF THE INVENTION

1. Field of the Invention

The present invention relates to a magnetoelectric generator that generates power by electromagnetic induction between a permanent magnet and a generating coil due to rotation of a flywheel, and to a method for the manufacture thereof.

2. Description of the Related Art

Conventional magnetoelectric generators are known that include: a bowl-shaped flywheel; a plurality of permanent magnets that are fixed to an inner circumferential wall surface of the flywheel so as to be arranged circumferentially; a stator core that is disposed radially inside the flywheel and that has an outer circumferential surface that faces the permanent magnets; a generating coil that is constituted by: a generating coil main body in which conducting wires are wound onto respective teeth that are formed on an outer circumferential portion of the stator core so as to project radially outward at a uniform pitch in a radial pattern; and output wires that are led axially outward from the generating coil main body; and a fixing material that is applied to a surface of the generating coil and heat-hardened (see Patent Literature 1, for example).

In these magnetoelectric generators, the output wires are fixed to the generating coil main body using a varnish at portions that are led axially outward from the generating coil main body in order to prevent an enamel coating of the conducting wires from being damaged by abrasion between crossover wires that connect coil portions of respective phases to each other and root portions of the output wires.

This fixing step is performed as a final step in manufacturing the magnetoelectric generator.

Specifically, the conducting wires of the generating coil main body are fixed to each other in a preceding step to this fixing step by applying a varnish to the generating coil main body and heat-hardening the varnish, then tip portions of the output wires and tip portions of the output lead wires are joined together by crimping and soldering, and the output wires are subsequently fixed to the generating coil main body by applying the varnish to the output wires and heat-hardening it.

[Patent Literature 1]

Japanese Patent Laid-Open No. 2003-164096 (Gazette: FIG. 1)

In conventional manufacturing of magnetoelectric generator stators, one problem has been that a long time is required for manufacturing the stator since the time-consuming step of heat-hardening the varnish is divided into two stages.

Another problem has been that irregularities arise in the fixing of the output wires onto the generating coil main body due to irregularities in the quantity of varnish applied.

SUMMARY OF THE INVENTION

The present invention aims to solve the above problems and an object of the present invention is to provide a magnetoelectric generator that enables manufacturing time to be shortened significantly by removing one time-consuming step of heat-hardening a fixing material, and also enables vibration resistance to be improved in output wires, etc.

In order to achieve the above object, according to one aspect of the present invention, there is provided a magnetoelectric generator that includes: a bowl-shaped flywheel; a plurality of permanent magnets that are fixed to an inner circumferential wall surface of the flywheel so as to be arranged circumferentially; a stator core that is disposed radially inside the flywheel and that has an outer circumferential surface that faces the permanent magnets; a generating coil that is constituted by: a generating coil main body in which a conducting wire is wound onto respective teeth that are formed on an outer circumferential portion of the stator core so as to project radially outward in a radial pattern; and an output wire that is led axially outward from the generating coil main body; and a fixing material that is applied to a surface of the generating coil and heat-hardened, the magnetoelectric generator being characterized in that: an insulating insert is inserted into a gap in the generating coil between adjacent teeth; and the output wire is fixed to the generating coil main body by the fixing material and is also fixed by being held between the insulating insert and the generating coil main body.

According to another aspect of the present invention, there is provided a method for manufacturing a magnetoelectric generator that includes steps of: winding the conducting wire onto each of the teeth; fixing the output wire of respective phases so as to be held between the insulating insert and the generating coil main body by inserting the insulating insert into the gap; applying the fixing material to the generating coil main body and the output wire; and simultaneously fixing together adjacent conducting wire of the generating coil main body and fixing the output wire to the generating coil main body by heat-hardening the fixing material.

Using a magnetoelectric generator and a method for the manufacture thereof according to the present invention has effects such as enabling manufacturing time to be shortened significantly by removing one time-consuming step of heat-hardening the fixing material, and also enabling vibration resistance to be improved in the output wire, etc.

DETAILED DESCRIPTION OF THE PREFERRED EMBODIMENTS

Preferred embodiments of the present invention will now be explained based on the drawings, and identical or corresponding members and portions in the drawings will be given identical numbering.

Embodiment 1

Figure 1:
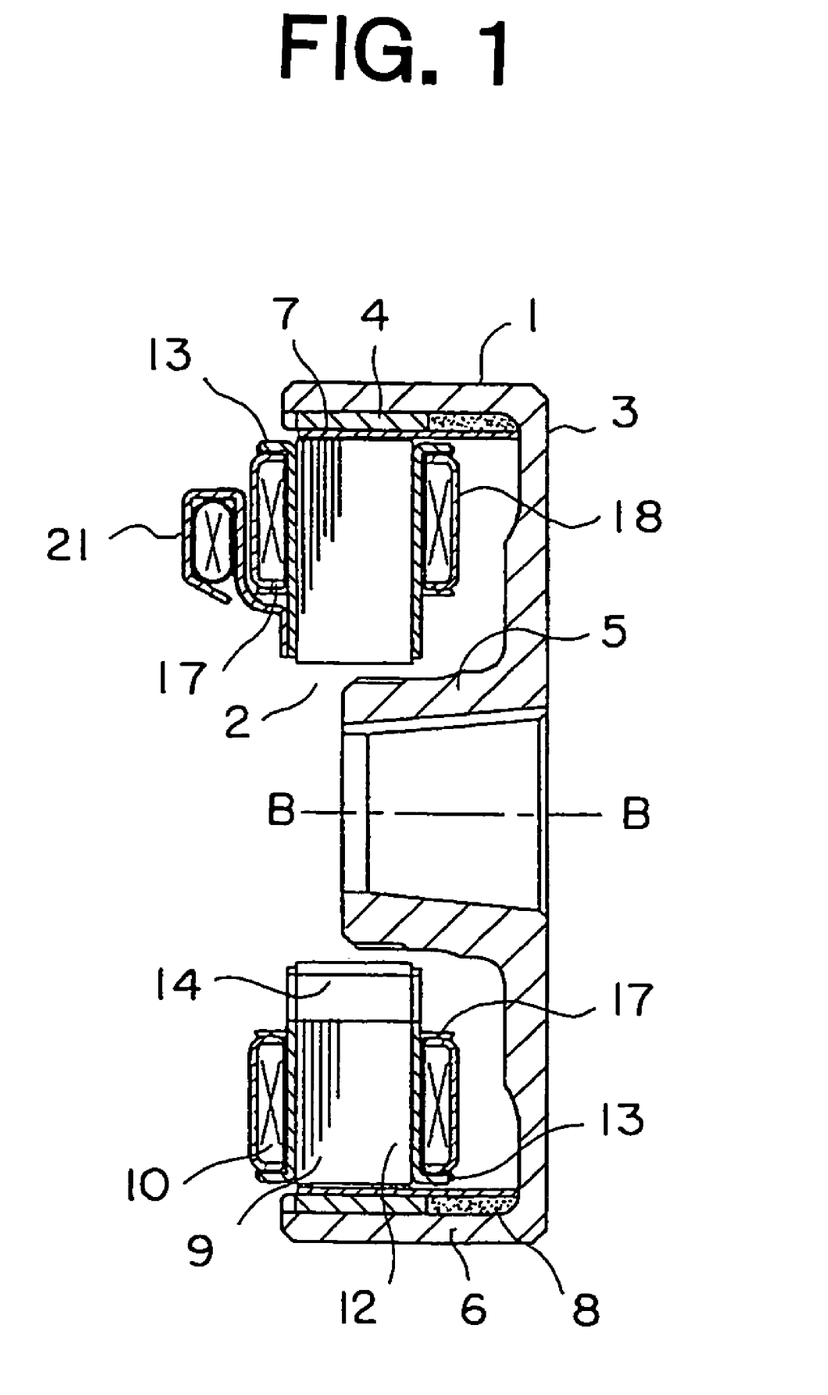
FIG. 1 is a lateral cross section of a magnetoelectric generator according to Embodiment 1 of the present invention.
Figure 2:
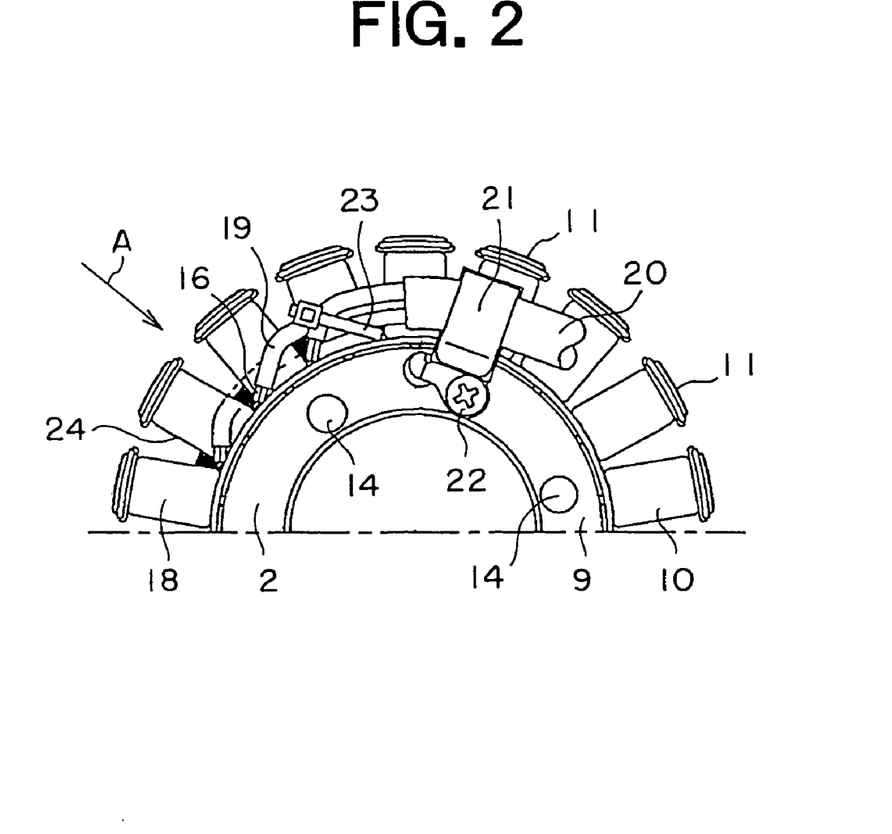
FIG. 2 is a partial front elevation of a stator of the magnetoelectric generator in FIG. 1.
Figure 3:
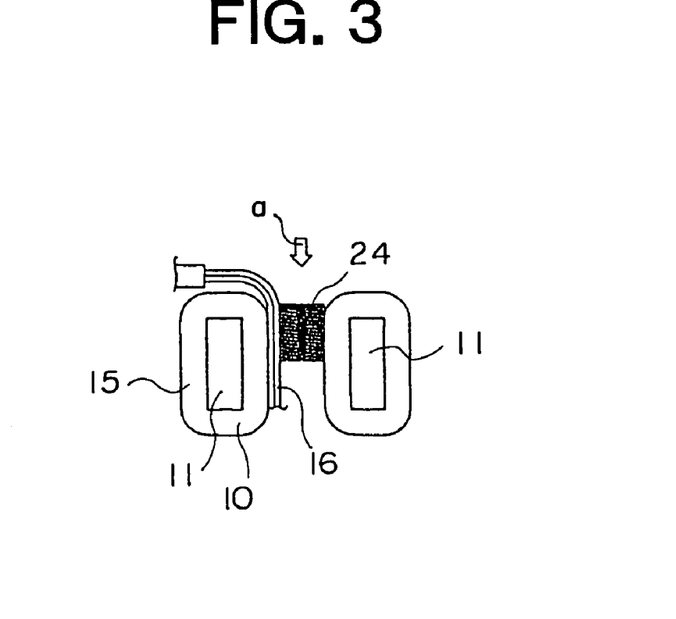
FIG. 3 is a partial side elevation of the stator from FIG. 2 when viewed in the direction of arrow A.

FIG. 1 is a lateral cross section of a magnetoelectric generator according to Embodiment 1 of the present invention, FIG. 2 is a partial front elevation of a stator 2 of the magnetoelectric generator in FIG. 1, and FIG. 3 is a partial side elevation of the stator 2 from FIG. 2 when viewed in the direction of arrow A.

This magnetoelectric generator includes: a rotor 1 that is linked to an internal combustion engine; and a stator 2 that is mounted to a fixing member (not shown) so as to face the rotor 1.

The rotor 1 includes: a bowl-shaped flywheel 3; and permanent magnets 4. The flywheel 3 rotates around an axis of rotation B-B. A boss portion 5 is fixed to a rotating shaft (not shown) that is driven to rotate by the internal combustion engine.

Four permanent magnets 4, for example, are fixed to an inner circumferential wall surface of a cylindrical portion 6 of the flywheel 3. The permanent magnets 4 are disposed at a uniform angular pitch from each other around the axis of rotation B-B such that two magnets magnetized in order of a North-seeking (N) pole, a South-seeking (S) pole, and a North-seeking (N) pole and two magnets magnetized in order of a South-seeking (S) pole, a North-seeking (N) pole, and a South-seeking (S) pole alternate with each other. The plurality of permanent magnets 4 are magnetized such that adjacent permanent magnets 4 have reverse polarity to each other such that a magnetic field that alternately changes in direction is generated in a space on an inner circumferential side of the permanent magnets 4.

A tubular protective ring 7 is inserted so as to be placed in close contact with inner circumferential surfaces of each of the permanent magnets 4. Regions near two end portions of each of the permanent magnets 4 in a direction of the axis of rotation B-B and between each of the adjacent permanent magnets 4 are filled with a resin material 8. The plurality of permanent magnets 4 and the protective ring 7 are fixed to the inner circumferential wall surface of the cylindrical portion 6 of the flywheel 3 by the resin material 8.

The stator 2 includes: a hollow cylindrical stator core 9; and a three-phase generating coil 10. A plurality of teeth 11 that project radially outward at a uniform pitch in a radial pattern are formed on an outer circumferential portion of the stator core 9.

The stator core 9 is constituted by: a laminated core 12 that is configured by laminating a large number of open-centered thin magnetic steel plates that are cold-rolled steel plates in a direction of the axis of rotation B-B; and end plates 13 that are respectively stacked in close contact with two end surfaces of the laminated core 12 and have outer circumferential edge portions that are respectively bent toward the generating coil 10.

A plurality of penetrating apertures 14 that pass through parallel to the axis of rotation B-B are formed on the laminated core 12 and the end plates 13. The laminated core 12 and the end plates 13 are integrated by bolts (not shown) that are passed through the penetrating apertures 14 and nuts (not shown) that are screwed onto end portions of the bolts (not shown).

The generating coil 10 is a three-phase generating coil, and has phase coil portions that are connected into a delta connection. A coating 18 that is constituted by a varnish is formed on circumferential side surfaces of the generating coil 10 in order to ensure rigidity of the generating coil 10 and insulation between conducting wires.

The generating coil 10 is constituted by: a generating coil main body 15; and output wires 16 that are led axially out from the generating coil main body 15.

The generating coil main body 15 is configured by winding conducting wires that each have a surface that is enamel-coated onto circumferential side surfaces of the teeth 11 of the stator core 9 with a resin molding material 17 interposed. The resin molding material 17 ensures electrical insulation between the generating coil main body 15 and the stator core 9, and may be an epoxy powder coating.

Resin insulating inserts 24 that have heat resistance, insulating properties, and elasticity are inserted into gaps in the generating coil 10 between adjacent teeth 11. The output wires 16 are fixed by being held between the inserted insulating inserts 24 and the generating coil main body 15.

Tip portions of pairs of output wires 16 that are led out axially so as to be spaced apart circumferentially are covered by first protective tubes 19. The first protective tubes 19 are superior in heat resistance and insulating properties, and are configured by impregnating a varnish into a tube into which polyester fibers are woven.

The tip portions of the output wires 16 of each of the phases are electrically connected inside the first protective tubes 19 to tip portions of output lead wires that have a strand construction by crimping and brazing using a solder. The output wires 16 of each of the phases and the output lead wires are each electrically connected, then inserted into the respective first protective tubes 19. The output wires 16 that are covered by the first protective tubes 19 are pressed against end surfaces of the generating coil main body 15 by resin bands 23 in order to ensure that the output wires 16 have vibration resistance.

End portions of the output lead wires that are connected to electrical equipment (not shown) are covered by a second protective tube 20. The output lead wires are fixed by a lead clamp 21 with the second protective tube 20 interposed. The lead clamp 21 is fixed to the stator core 9 by a screw 22.

Figure 4:
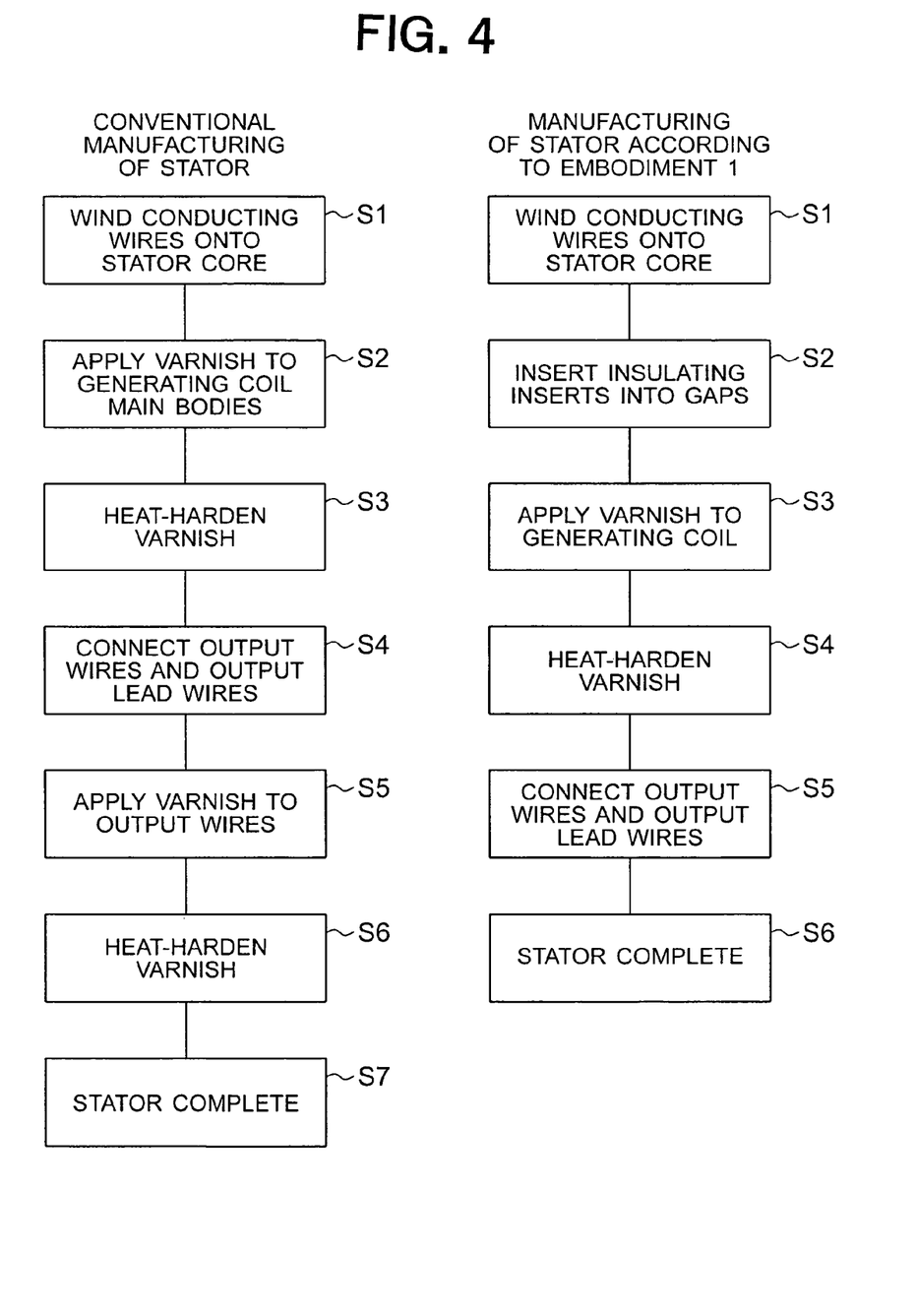
FIG. 4 is a flowchart of manufacturing steps for the magnetoelectric generator in FIG. 1.

Next, a method for manufacturing a stator 2 of a magnetoelectric generator that has the above configuration will explained based on FIG. 4.

First, the conducting wires are wound onto the teeth 11 of the stator core 9 (Step S1).

Figure 5:
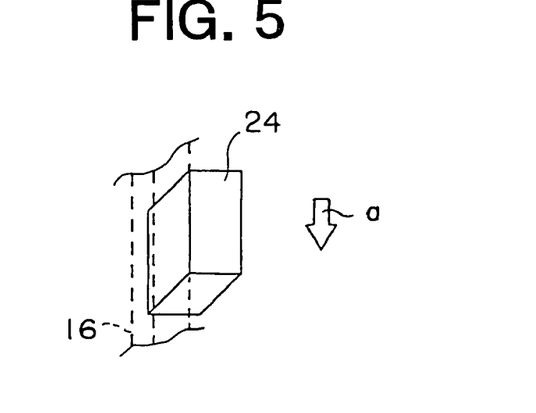
FIG. 5 is a diagram that shows a relationship between an insulating insert and output wires from FIG. 2.

Next, the output wires 16 are fixed against the generating coil main body 15 by inserting the insulating inserts 24 into the gaps in the generating coil 10 as shown in FIGS. 3 and 5 in the direction of arrow a along the output wires 16 that have been led out axially (Step S2).

After that, the varnish that constitutes the fixing material is applied and impregnated between the conducting wires, and between the generating coil main body 15 and the output wires 16 by dripping the varnish onto an outer surface of the generating coil 10 from an axial direction of the generating coil 10 with intermediate portions of the output wires 16 of each of the phases bent into an L shape circumferentially and with the output wires 16 fixed against the generating coil main body 15 (Step S3).

Next, the conducting wires are fixed together and the generating coil main body 15 and the output wires 16 are fixed by the varnish, and the coating 18 is also formed on the surface of the generating coil 10, by heat-hardening the varnish (Step S4).

After that, the tip portions of the output wires 16 of each of the phases are electrically connected to the tip portions of the output lead wires by crimping and brazing using a solder, then manufacturing of the stator 2 is completed by covering the end portions of the output wires 16 and the end portions of the output lead wires with the first protective tubes 19 (Steps S5 and S6).

Moreover, a conventional method for manufacturing a magnetoelectric generator stator is shown on the left in FIG. 4 for reference.

In the conventional method for manufacturing a stator, fixing together of the conducting wires of the generating coil main body 15 by the varnish and formation of the coating 18 (Steps S2 and S3), and fixing between the generating coil main body 15 and the output wires 16 by the varnish (Steps S5 and S6) are separate from each other.

In the conventional case, if an attempt was made to perform the above two steps simultaneously, the varnish that was dripped from an axial direction of the generating coil 10 flowed down without remaining in the output wires 16, and the positions of the output wires 16 relative to the generating coil main body 15 were indeterminate and the fixing strength of the output wires 16 against the generating coil main body 15 was insufficient and unstable, making it impossible to perform the above two steps simultaneously.

In contrast to that, in the stator 2 according to Embodiment 1, because the insulating inserts 24 block the gaps in the generating coil 10, and prevent the downward flow of the varnish through the gaps, and the output wires 16 are also positioned by being pressed against the generating coil main body 15, two problems of conventional configurations are solved, enabling the above two steps to be performed simultaneously.

In a magnetoelectric generator that has the above configuration, the flywheel 3 rotates interdependently with a rotating shaft that is driven to rotate by the internal combustion engine, and as it does so electric power is generated in the generating coil 10 due to the alternating magnetic field that is generated by the permanent magnets 4. The resulting alternating-current output is rectified by rectifying diodes (not shown), and is supplied to a load such as a vehicle battery, etc., through the output lead wires.

In a magnetoelectric generator according to this embodiment, the insulating inserts 24 are inserted into gaps in the generating coil 10 between adjacent teeth 11, and the output wires 16 are fixed by being held between the inserted insulating inserts 24 and the generating coil main body 15.

Consequently, it is also possible to fix the output wires 16 to the generating coil main body 15 simultaneously when the conducting wires of the generating coil main body 15 are fixed together and the coating 18 is formed by heat-hardening by the varnish, significantly shortening manufacturing time compared to conventional methods for manufacturing a stator, in which there were two steps for heat-hardening the varnish.

The output wires 16 are fixed against the generating coil main body 15 by the varnish and also fixed by the insulating inserts 24, improving the vibration resistance of the output wires 16.

The insulating inserts 24 are also fixed firmly in the gaps in the generating coil 10 by the varnish.

Intermediate portions of the output wires 16 of each of the phases are bent into an L shape circumferentially toward the output lead wires before the varnish is applied by being dripped onto the outer surfaces in an axial direction of the generating coil 10 and impregnated between the conducting wires and between the generating coil main body 15 and the output wires 16.

Because the intermediate portions of the output wires 16 of each of the phases are bent into an L shape before the varnish is dripped in this manner, problems that arise when the output wires 16 are bent after the varnish has hardened are eliminated, i.e., there is no need to perform troublesome operations such as having to remove hardened varnish that has adhered to the output wires before bending the output wires 16 to prevent the enamel coating of the conducting wires from peeling off.

Embodiment 2

Figure 6:
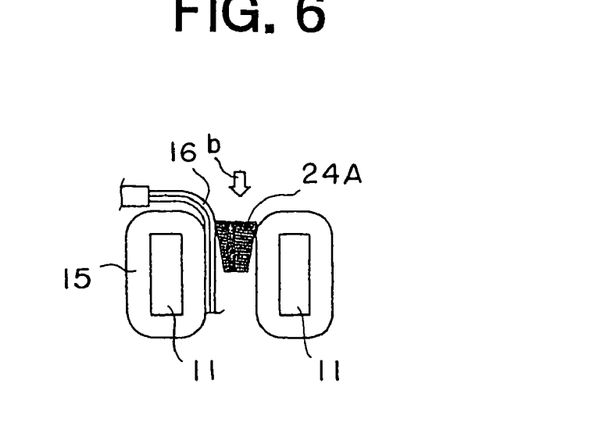
FIG. 6 is a partial side elevation of a stator of a magnetoelectric generator according to Embodiment 2 of the present invention.

FIG. 6 is a partial side elevation of a magnetoelectric generator according to Embodiment 2 of the present invention.

In this embodiment, insulating inserts 24A have a wedge shape that tapers axially inward.

The rest of the configuration is identical to that of Embodiment 1.

Figure 7:
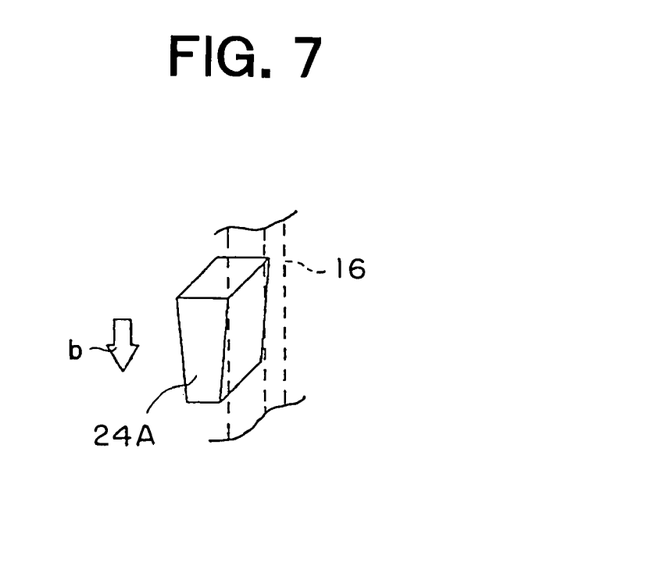
FIG. 7 is a diagram that shows a relationship between an insulating insert and output wires from FIG. 6.

In this embodiment, because the insulating inserts 24A have a wedge shape, the insulating inserts 24A can be inserted smoothly into the gaps between the generating coil main body 15 along the output wires 16 in the direction of arrows b in FIGS. 6 and 7.

Embodiment 3

Figure 8:
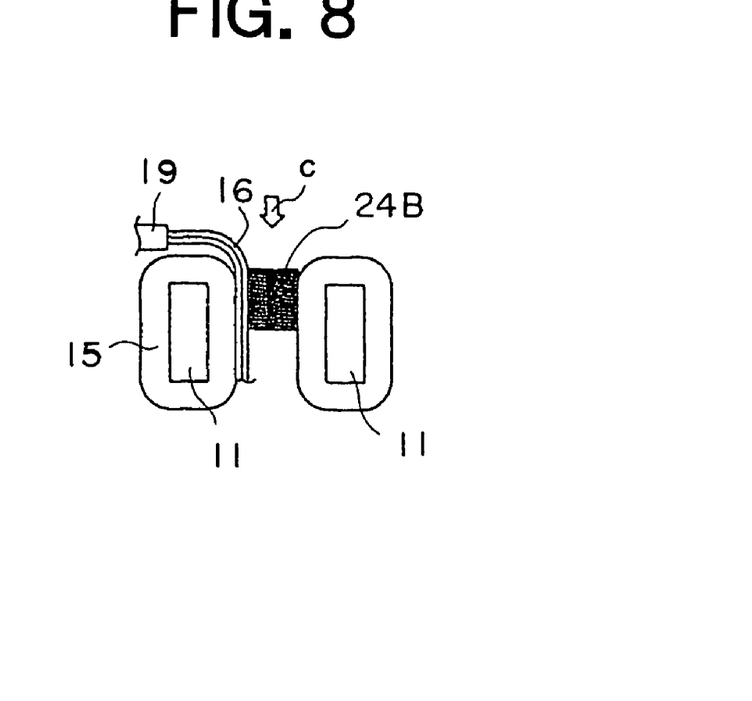
FIG. 8 is a partial side elevation of a stator of a magnetoelectric generator according to Embodiment 3 of the present invention.

FIG. 8 is a partial side elevation of a magnetoelectric generator according to Embodiment 3 of the present invention.

In this embodiment, a pair of semicircular close-contact surfaces 25 that match cross-sectional shapes of the output wires 16 are formed on insulating inserts 24B.

The rest of the configuration is identical to that of Embodiment 1.

Figure 9:
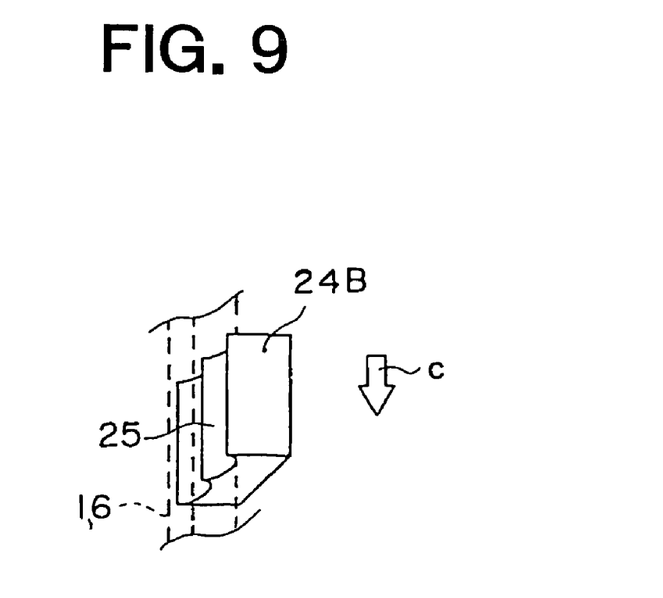
FIG. 9 is a diagram that shows a relationship between an insulating insert and output wires from FIG. 8.

In this embodiment, because the close-contact surfaces 25 that match the cross-sectional shapes of the output wires 16 are formed on the insulating inserts 24B, the insulating inserts 24B can be inserted smoothly into the gaps between the generating coil main body 15 along the output wires 16 in the direction of arrows c in FIGS. 8 and 9. Contact surface area between the insulating inserts 24B and the output wires 16 is also increased, increasing fixing force of the insulating inserts 24B against the output wires 16.

Embodiment 4

Figure 10:
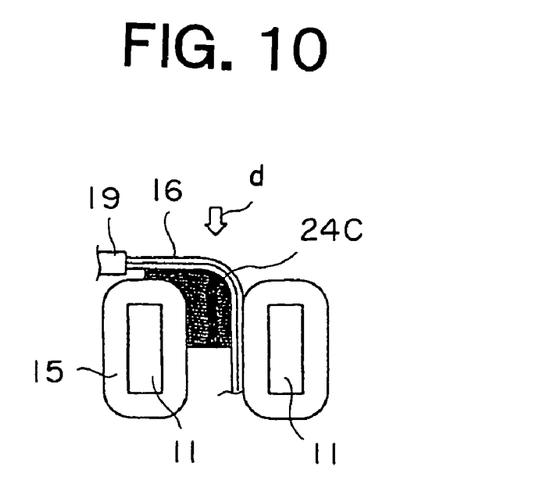
FIG. 10 is a partial side elevation of a stator of a magnetoelectric generator according to Embodiment 4 of the present invention.

FIG. 10 is a partial side elevation of a magnetoelectric generator according to Embodiment 4 of the present invention.

In this embodiment, insulating inserts 24C are constituted by: an inserted portion 26 that extends axially; and a close-contact portion 27 that is bent circumferentially from the inserted portion 26 and that has a pair of semicircular close-contact surfaces that match cross-sectional shapes of the output wires 16.

The rest of the configuration is identical to that of Embodiment 1.

Figure 11:
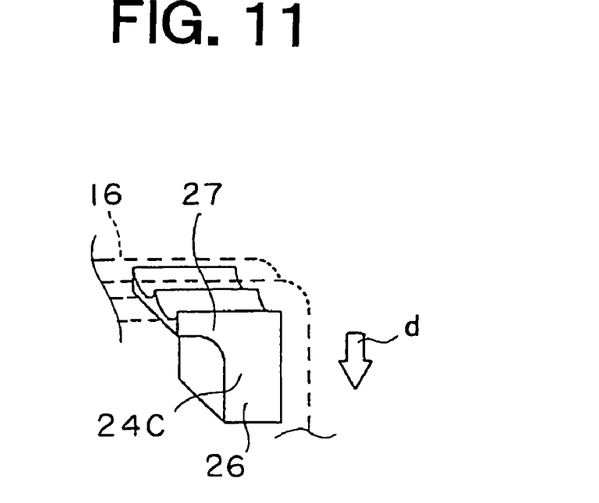
FIG. 11 is a diagram that shows a relationship between an insulating insert and output wires from FIG. 10.

In this embodiment, because the insulating inserts 24C have an inserted portion 26, the insulating inserts 24C can be inserted into the gaps between the generating coil main body 15 along the output wires 16 in the direction of arrows d in FIGS. 10 and 11.

Because the insulating inserts 24C have a close-contact portion 27, the end portions of the output wires 16 are directed toward output lead wires by being bent into an L shape and placed in close contact with the close-contact surfaces of the close-contact portion 27, improving workability of joining between the output wires 16 and the output lead wires.

Contact surface area between the output wires 16 and the close-contact portion 27 is also increased, increasing fixing force of the insulating inserts 24B against the output wires 16 by the varnish.

Moreover, in each of the above embodiments, a three-phase generating coil 10 in which phase coil portions are connected into a delta connection has been explained, but the present invention can also be applied to three-phase generating coils in which phase coil portions are connected into a star connection.

In each of the above embodiments, a varnish was used as the fixing material, but of course the fixing material is not limited to a varnish, and a thermosetting epoxy resin, for example, may also be used.

What is claimed is:

1. A magnetoelectric generator comprising:
    a bowl-shaped flywheel;
    a plurality of permanent magnets that are fixed to an inner circumferential wall surface of said flywheel so as to be arranged circumferentially;
    a stator core that is disposed radially inside said flywheel and that has an outer circumferential surface that faces said permanent magnets;
    a generating coil that is constituted by:
        a generating coil main body in which a conducting wire is wound onto respective teeth that are formed on an outer circumferential portion of said stator core so as to project radially outward in a radial pattern; and
        an output wire that is led axially outward from said generating coil main body; and
    a fixing material that is applied to a surface of said generating coil and heat-hardened;
    wherein an insulating insert is inserted into a gap in said generating coil between adjacent teeth; and
    said output wire is fixed to said generating coil main body by said fixing material and is also fixed by being held between said insulating insert and said generating coil main body.

2. A magnetoelectric generator according to claim 1, wherein said insulating insert has a wedge shape that tapers axially inward.

3. A magnetoelectric generator according to claim 1, wherein a close-contact surface that has a shape that matches a cross-sectional shape of said output wire is formed on said insulating insert.

4. A magnetoelectric generator according to claim 1, wherein said insulating insert is constituted by:
    an inserted portion that extends axially inward; and
    a close-contact portion that is bent circumferentially from said inserted portion and that has a close-contact surface that has a shape that matches a cross-sectional shape of said output wire.

5. A magnetoelectric generator according to claim 1, wherein said insulating insert is constituted by an elastic resin.

6. A method for manufacturing a magnetoelectric generator according to claim 1,
    wherein said method for manufacturing a magnetoelectric generator includes steps of:
    winding said conducting wire onto each of said teeth;
    fixing said output wire of respective phases so as to be held between said insulating insert and said generating coil main body by inserting said insulating insert into said gap;
    applying said fixing material to said generating coil main body and said output wire; and
    simultaneously fixing together adjacent conducting wire of said generating coil main body and fixing said output wire to said generating coil main body by heat-hardening said fixing material.

7. A method for manufacturing a magnetoelectric generator according to claim 6, wherein said fixing material is applied to said generating coil main body and said output wire after said output wire that is led out from said generating coil main body is bent circumferentially toward output lead wires that are connected to electrical equipment.

* * * * *